Oct. 20, 1925.
L. E. WALTER
SCOOTER WAGON
Filed Aug. 25, 1924
1,557,634
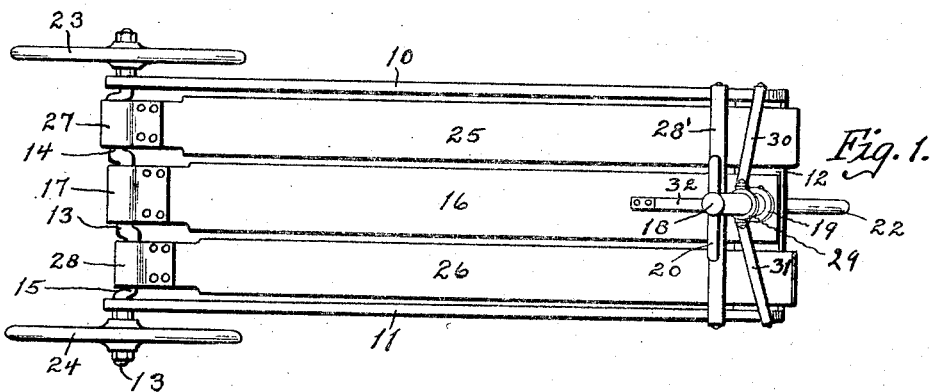
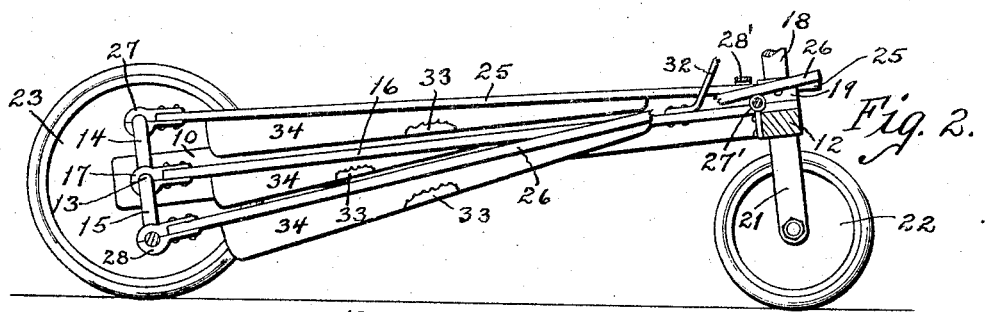
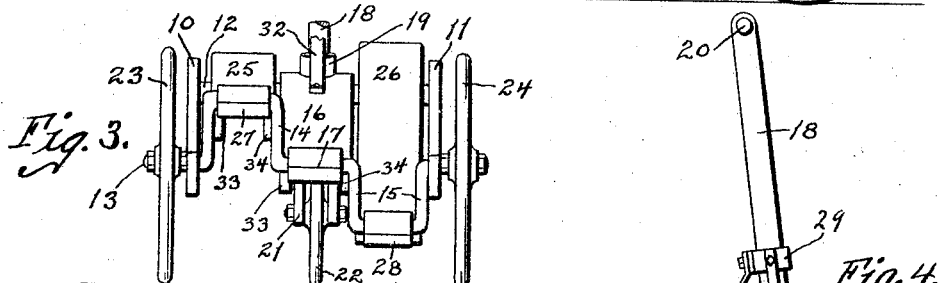
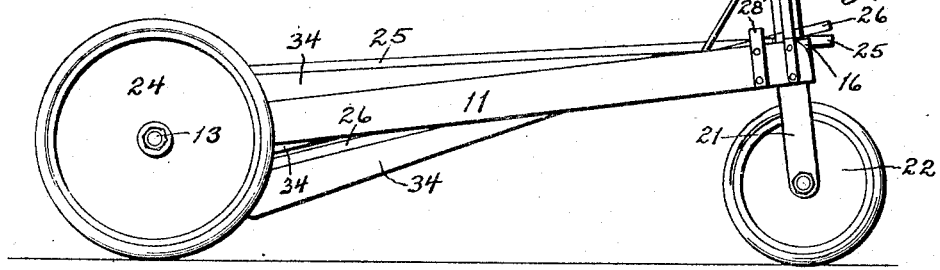
Inventor
L. E. WALTER
by Earl M. Sinclair Atty Patented Oct. 20, 1925.

1,557,634

UNITED STATES PATENT OFFICE.

LOWELL E. WALTER, OF DES MOINES, IOWA.

SCOOTER WAGON.

Application filed August 25, 1924. Serial No. 733,955.

*To all whom it may concern:*

Be it known that I, LOWELL E. WALTER, a citizen of the United States of America, and resident of Des Moines, Polk County, Iowa, have invented a new and useful Scooter Wagon, of which the following is a specification.

The object of this invention is to provide an improvement in scooter cars or wagons, wherein the vehicle is propelled by the user standing in upright position on a pair of pedal plates adapted for oscillation, a stationary plate also being provided to which the weight may be transferred at times, as for coasting.

A further object of this invention is to provide an improved scooter car in which a pedal plate is mounted for oscillation on either side of a rigid member, the pedal plates being provided at their rear ends with bearings on opposed cranks of an axle, and at their forward ends being longitudinally slidable in the frame.

A further object of this invention is to provide an improved method of mounting pedal plates for oscillatory movement, there rear ends having bearings on a crank axle while their forward ends are arranged for reciprocation on rollers carried by a frame.

A further object of this invention is to provide safety means in the form of depending flanges on side margins of the oscillatory pedal plates.

A further object is to provide means for limiting vertical movement of the reciprocating ends of the pedal plates.

With these and other objects in view, my invention consists in the construction, arrangement and combination of elements hereinafter set forth, pointed out in the claims and illustrated by the accompanying drawing, in which—

Figure 1 is a plan view of my improved vehicle.

Figure 2 is a longitudinal sectional view of the device, a portion of the steering post being broken away.

Figure 3 is a rear elevation, a portion of the steering post being broken away.

Figure 4 is a side elevation of the complete device.

In the construction of the device as shown the numerals 10, 11 designate spaced side frame members, rigidly connected at their forward ends by a cross-bar 12. The rear end portions of the side members 10, 11 are provided with bearings for end portions of an axle 13, which is formed adjacent and just inside of said frame members with opposed cranks 14, 15. A rigid central foot plate 16 is provided, having at its rear end a bearing 17 through which a central portion of the crank axle 13 extends rotatably, the forward end of said rigid foot plate resting on and being secured to the central portion of the cross-bar 12. A steering post 18 is arranged in substantially vertical position and extends rotatably through the central portions of the cross-bar 12 and front end of the rigid foot plate 16, a collar 19 preferably being fixed to said post just above said foot plate to prevent downward movement of said post. The steering post 18 may be provided at its upper end with a cross pin 20 or other suitable means for holding and manually turning it and the steering wheel. A fork 21 is formed on the lower end of the steering post 18, below the cross-bar 12, and a steering wheel 22 is pivoted in said fork. Wheels 23, 24 are fixed to and for rotation with the crank axle 13, and are located outside of the frame members 10, 11 respectively.

A pair of longitudinally extending pedal plates 25, 26 are provided, and have at their rear ends bearings 27, 28, on the respective throws or cranks 14, 15 of the rear axle. The pedal plates 25, 26 are located on opposite sides of and adjacent to the central foot plate 16, and their forward ends extend across the cross-bar 12 at the front of the vehicle and are adapted for reciprocal movement relative thereto as their rear ends describe circular movements about the axis of the crank axle. Rollers 27', or other suitable anti-friction means, may be carried by the cross-bar 12, the forward ends of the pedal plates being adapted for movement on said rollers. A keeper bar 28' of yoke form is arranged across the front end of the vehicle, its arms being secured to the side members 10, 11 and its central portion extending above and in spaced relation to the forward portions of the pedal plates, to prevent undue upward movement of the free ends thereof.

If desired an additional bearing 29 may be provided for the steering post 18, located at a distance above the foot plate 16 and supported by braces 30, 31, 32 having their lower ends fixed, respectively, to the side frame members 10, 11 and the central foot plate 16.

In practical use the operator stands with one foot on each pedal plate 25 or 26, and his weight is shifted alternately from one to the other and his legs and body moved in such manner as to cause said pedal plates to describe oscillatory movements, their rear ends traveling in circular orbits and their forward ends reciprocating on the rollers 27'. This movement of the pedal plates is communicated to the cranks 14, 15 of the axle, causing the rear wheels to be turned and the vehicle propelled. For convenience in turning corners and the like, one only of the wheels 23, 24 may be made fast to the axle, the other being mounted loosely thereon if desired. The operator grasps the steering post 18 to brace himself and also to steer the vehicle.

It is obvious that any suitable gearing mechanism may be interposed between the crank axles and the rear wheels if desired, without departing from my invention; also that a single wheel may be used at the rear instead of the two as shown.

Flanges 33, 34 are fixed to and project downwardly from the respective side margins of the pedal plates 25 and 26 and also the rigid plate 16, and said flanges are of a width corresponding approximately to the spaces, vertically, between the rigid plate and pedal plates when the latter are at their extremes of up and down movement. The flanges 33, 34 extend throughout the major portions of the length of the plates, and it is their function to provide guards which prevent the entrance of the operator's toes between said plates during operation of the vehicle.

At times the operator may shift one or both feet to the rigid plate 16, when he wishes to rest or to coast. Braking effect may be applied to the pedal plates, and the wheels, by back pedalling. The pedal plates, being of substantially the same length as the vehicle, have ample leverage on the axle cranks, and the lever advantage may be varied by shifting the operator's position longitudinally thereof. The rollers 27' provide an easy sliding arrangement for the forward ends of the pedal plates, but they may be omitted if desired and the plates allowed to slide directly on the cross bar.

I claim as my invention:—

1. In a scooter vehicle, a frame, a steering wheel at the forward end thereof, a crank axle journaled at the rear of said frame and having opposed cranks, and pedal plates having bearings at their rear ends directly on said cranks and having their forward ends arranged for reciprocal sliding movement relative to said frame.

2. In a scooter vehicle, a frame, a steering wheel at the forward end thereof, a crank axle journaled at the rear of said frame and having opposed cranks, a rigid plate arranged centrally and longitudinally of the frame and having a bearing at its rear end for said crank axle, and pedal plates arranged on opposite sides of said rigid plate, extending the substantial length of the frame, said pedal plates having bearings at their rear ends on said cranks and having their forward ends slidably mounted on said frame.

3. In a scooter vehicle, side frame members, a cross-bar rigidly connecting the forward ends thereof, a steering post pivoted in said cross-bar and having a steering wheel journaled at its lower end, a crank axle journaled in said side frame members and having opposed cranks, wheels on said crank axle, a central foot plate extending longitudinally of the frame and having at its rear end a bearing for said axle, pedal plates mounted for oscillation on opposite sides of said foot plate, each having a bearing on a crank of said axle, and rollers journaled on said cross-bar, said pedal plates having their forward ends arranged for reciprocation on said rollers.

4. In a scooter vehicle, a frame, a steering wheel at the forward end thereof, a crank axle journaled at the rear of said frame and having opposed cranks, wheels mounted at the rear end of and adapted to support said frame and arranged to be driven from said crank axle, a rigid plate arranged centrally of said frame and having a bearing at its rear end for said axle, and pedal plates arranged for oscillation on opposite sides of said rigid plate, each of said pedal plates having a bearing directly on one of the cranks of said axle and having its forward end arranged for reciprocation on said frame, said rigid plate and pedal plates having depending flanges on their side margins bridging the vertical spaces between them.

5. In a scooter vehicle, a frame, a steering post pivoted in the forward end thereof, a steering wheel carried by the steering post, a crank axle journaled in the rear end of said frame and having opposed cranks, wheels on said crank axle, pedal plates mounted for oscillation and each having a bearing at its rear end on a crank of said axle, and rollers journaled in the forward end of said frame, said pedal plates having their forward ends arranged for reciprocation on said rollers.

6. In a scooter vehicle, a frame, a steering post pivoted in the forward end thereof, a steering wheel carried by the lower end of said post, a crank axle journaled in the rear end of said frame and having opposed cranks, wheels on said axle, and a pair of pedal plates each having its rear end provided with a bearing on a crank of said axle and its forward end arranged for reciprocal movement relative to said frame.

Signed at Des Moines, in the county of Polk and State of Iowa, this 18th day of August, 1924.

LOWELL E. WALTER.